US012426135B2

(12) United States Patent
Liu et al.

(10) Patent No.: US 12,426,135 B2
(45) Date of Patent: Sep. 23, 2025

(54) TRANSPARENT METAL COATINGS FOR CAMERA PANE IN MICROWAVE OVEN

(71) Applicant: WHIRLPOOL CORPORATION, Benton Harbor, MI (US)

(72) Inventors: Junxiu Liu, Shenzhen (CN); Zhiying Wang, Shenzhen (CN); Lian Qiang Zhou, Shenzhen (CN)

(73) Assignee: Whirlpool Corporation, Benton Harbor, MI (US)

( * ) Notice: Subject to any disclaimer, the term of this patent is extended or adjusted under 35 U.S.C. 154(b) by 754 days.

(21) Appl. No.: 17/588,812

(22) Filed: Jan. 31, 2022

(65) Prior Publication Data

US 2022/0248508 A1 Aug. 4, 2022

(30) Foreign Application Priority Data

Feb. 1, 2021 (CN) ......................... 202110133827.X

(51) Int. Cl.
*H05B 6/64* (2006.01)
*F21V 15/01* (2006.01)
(Continued)

(52) U.S. Cl.
CPC ........... *H05B 6/6447* (2013.01); *F21V 15/01* (2013.01); *H04N 23/52* (2023.01); *H04N 23/57* (2023.01); *H05B 6/6444* (2013.01)

(58) Field of Classification Search
CPC .. H05B 6/6447; H05B 6/6444; H05B 6/6402; H05B 6/766; H05B 6/64; F21V 15/01; H04N 23/52; H04N 23/57; H05K 9/0084
See application file for complete search history.

(56) References Cited

U.S. PATENT DOCUMENTS

| 6,822,208 B2* | 11/2004 | Henze ..................... F24C 15/04 |
| | | 126/200 |
| 8,660,297 B2* | 2/2014 | Yoon ....................... F24C 7/085 |
| | | 382/100 |

(Continued)

FOREIGN PATENT DOCUMENTS

| CN | 106535384 A | 3/2017 |
| DE | 3923734 C1 | 8/1990 |

(Continued)

OTHER PUBLICATIONS

Chinese Office Action for CN 202110133827X dated May 23, 2023 and English Translation.

(Continued)

*Primary Examiner* — Tsion Tumebo
(74) *Attorney, Agent, or Firm* — Brooks Kushman P.C.

(57) ABSTRACT

A heating appliance, such as a microwave oven, includes a housing having interior walls with interior surfaces defining a cooking chamber for heating food. The heating appliance also includes a camera positioned within the housing to capture images of food in the chamber, and a shield positioned between the camera and the food. The shield has a body with a first surface facing an area for receiving food within the chamber and a second opposite surface facing the camera. The shield includes a first transparent conductive metal coating on one or both of the first surface and the second surface, such that the shield dissipates heat and reflects microwave radiation to protect the camera.

20 Claims, 2 Drawing Sheets

(51) Int. Cl.
*H04N 23/52* (2023.01)
*H04N 23/57* (2023.01)

(56) References Cited

U.S. PATENT DOCUMENTS

| | | | |
|---|---|---|---|
| 10,117,294 | B2 | 10/2018 | Beifuss et al. |
| 10,440,245 | B1* | 10/2019 | Johnson ................ H04N 23/57 |
| 10,674,569 | B2 | 6/2020 | Luckhardt et al. |
| 11,116,050 | B1* | 9/2021 | Bhogal ................ H05B 6/6447 |
| 11,388,788 | B2* | 7/2022 | Denker ................ H05B 6/668 |
| 2009/0008387 | A1* | 1/2009 | Boxman ............ H05B 6/6414 |
| | | | 219/757 |
| 2017/0188416 | A1 | 6/2017 | Beifuss et al. |
| 2017/0208652 | A1* | 7/2017 | Luckhardt ................ G06T 7/55 |
| 2017/0343220 | A1* | 11/2017 | Ha ........................ H05B 6/6485 |
| 2018/0035495 | A1 | 2/2018 | Millett |
| 2019/0014240 | A1* | 1/2019 | Lee ........................ H04N 7/18 |
| 2019/0215917 | A1 | 7/2019 | Huang |
| 2019/0234617 | A1* | 8/2019 | Bhogal ................ F24C 3/124 |

FOREIGN PATENT DOCUMENTS

| | | |
|---|---|---|
| EP | 2444735 B1 | 2/2018 |
| JP | 2018-120779 A | 8/2018 |
| TW | 201532998 A | 9/2015 |
| WO | 2016/144312 A1 | 9/2016 |
| WO | 2017/020307 A1 | 2/2017 |
| WO | 2017/020308 A1 | 2/2017 |
| WO | 2017/020309 A1 | 2/2017 |
| WO | 2017/020310 A1 | 2/2017 |
| WO | 2019/044325 A1 | 3/2019 |

OTHER PUBLICATIONS

Chinese Office Action, Search Report for CN Application No. 202110133827.X dated Dec. 19, 2022 and machine translation, 17 pages.

EP Search Report for EP Application No. 22154641.9 dated Jun. 17, 2022.

* cited by examiner

TRANSPARENT METAL COATINGS FOR CAMERA PANE IN MICROWAVE OVEN

CROSS-REFERENCE TO RELATED APPLICATION

This application claims priority to Chinese Patent Application No. 202110133827X filed Feb. 1, 2021, the disclosure of which is hereby incorporated in its entirety by reference herein.

TECHNICAL FIELD

The present application is directed to a microwave heating appliance, and more particularly transparent metal coatings for protecting cameras in microwave heating appliances.

BACKGROUND

Ovens are heating appliances for food preparation having a housing defining a cavity forming a cooking chamber therein. Ovens include a heating mechanism for cooking food placed within the cooking chamber, with the heating mechanism being variable across different types of ovens. Common types of ovens include electric ovens (which include conduction/conventional and convection ovens), gas ovens, toaster ovens, and microwave oven. The heating mechanisms vary across these ovens, with some including the heating mechanisms within the cooking chamber itself (e.g., conventional ovens), or in the housing (e.g., convection ovens) such that energy or heat is transferred to the cooking chamber or the food. The heating mechanism in electric ovens includes electric coils (with circulation via fans in convection ovens) to heat the cooking chamber, in gas ovens includes burning natural gas to heat the cooking chamber, and in microwave ovens includes electromagnetic radiation via strong radio waves from magnetrons to heat the food itself.

Modern domestic appliances commonly include a camera for monitoring the interior of the appliance. In ovens, the camera can monitor the cooking chamber and allow for food recognition functions, rendering direct observation by a user unnecessary. The camera is typically included within the housing, such that the camera is not affected by the radiation from the magnetrons used for heating the food in the cooking chamber, but this may limit the angle, quality, and sight-line available for the camera view as based on design constraints for the housing. For example, the camera may be installed in the handle of the door and facing into the cooking chamber, however the sight line is still through the oven door, and limited to angles based on the door handle design. Thus, mounting the camera inside the cooking chamber would allow for real time images of the food as it is cooking, with improved positioning and viewing angles. However, the microwave oven with convection or grilling may generate heat and microwaves while operating, which may impact the camera.

In order to shield the camera within in the cooking chamber in typical ovens, the camera may be positioned behind a glass panel (to prevent food splatter) and a metal shielding plate perforated with small holes. However, the perforated metal shielding plate affects the image quality provided by the camera, and because the shielding plate limits the vision function, features such as food recognition may be limited.

SUMMARY

According to one or more embodiments, a heating appliance includes a housing having interior walls with interior surfaces defining a cooking chamber for heating food. The heating appliance also includes a camera positioned within the housing to capture images of food in the chamber, and a shield positioned between the camera and the food. The shield has a body with a first surface facing an area for receiving food within the chamber and a second opposite surface facing the camera. The shield includes a first transparent conductive metal coating on one or both of the first surface and the second surface, such that the shield dissipates heat and reflects microwave radiation to protect the camera.

According to at least one embodiment, the first transparent conductive metal coating may be at least one of silver, gold, copper, tin oxide, or zinc oxide. In one or more embodiments, the first transparent conductive metal coating may be fluorine doped or indium doped. In certain embodiments, the first transparent conductive coating may be a fluorine doped tin oxide, an indium doped tin oxide, a fluorine doped zinc oxide, or an indium doped zinc oxide. In at least one embodiment, the shield with the first transparent conductive coating may have an opacity of 0.0 to 0.65. In certain embodiments, the shield with the first transparent conductive coating may have a transparency of at least 70%. In one or more embodiments, the shield may be glass or plastic. In at least one embodiment, the heating appliance may further include a light source mounted to the housing and positioned to illuminate the chamber. Furthermore, in certain embodiments, the light source may be positioned adjacent to the camera and facing the second surface such that both the camera and the light source are protected by the shield. In at least one other embodiment, the heating appliance may further include a light source housing having an inner surface facing the light source and an outer surface facing the area within the chamber for receiving food, the light source housing including a second transparent conductive metal coating on the outer surface to protect the light source from heat, microwave radiation, or both. In certain embodiments, the camera may be mounted to the interior surfaces of the interior walls within the chamber. In at least one embodiment, the camera may be mounted to the housing on an opposite side of the interior walls with respect to the interior surfaces such that the camera captures images of the chamber via an opening in the interior walls.

According to one or more embodiments, a heating appliance includes a housing having interior walls with interior surfaces defining a cooking chamber for heating food, and a shield mounted to the housing. The shield has a body with an outer surface facing a food area and an inner surface facing an inner cavity, with the body including a transparent conductive metal coating on the outer surface, the inner surface, or both. The heating appliance also includes a camera mounted within the inner cavity and positioned to capture images of the food area through the shield. Furthermore, the heating appliance includes a light source mounted within the inner cavity to transmit light through the shield. The shield is sized to protect the camera and the light source such that the shield reflects microwave radiation and dissipates heat to protect the camera and the light source.

According to at least one embodiment, the transparent conductive metal coating may be silver, gold, copper, tin oxide, or zinc oxide. In one or more embodiments, the transparent conductive metal coating may be fluorine doped or indium doped. In certain embodiments, the shield with the transparent conductive coating may have an opacity of 0.0 to 0.65.

According to one or more embodiments, a heating appliance includes a housing having interior walls with interior surfaces defining a cooking chamber for heating food, and a plurality of shields mounted to the housing. Each shield has a body with an outer surface facing the food and an inner surface facing a corresponding inner region. Each body includes a transparent conductive metal coating on the outer surface, the inner surface, or both. The heating appliance also includes a camera mounted on the inner region of a first shield of the plurality of shields, the camera being positioned to capture images of the food through the first shield. Furthermore, the heating appliance includes a light source mounted within the inner region of a second shield of the plurality of shields to transmit light through the second shield. Each of the first and second shields protects the camera and the light source, respectively, by dissipating heat and reflecting microwave radiation.

According to at least one embodiment, the transparent conductive metal coating may be silver, gold, copper, tin oxide, or zinc oxide. In one or more embodiments, the transparent conductive metal coating may be fluorine doped or indium doped. In certain embodiments, each shield with the transparent conductive coating may have an opacity of 0.0 to 0.65.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a heating appliance for cooking food, such as a microwave, includes a cooking chamber defined in a housing, with a camera positioned within the cooking chamber for monitoring the interior of the cooking chamber. A window shield for the camera is mounted within the cooking chamber to protect the camera within the cooking chamber. The window shield includes a pane with at least one conductive metal coating that is substantially transparent (e.g., having an opacity of 0.0 to 0.65, or in other words, at least 35% transparent) on the side of the pane exposed to the cooking chamber. The coated window shield allows light transmission through the pane and the coating such that the camera has good lighting for capturing images, and isolates the heat from the camera to protect the camera. As such, the window shield provides a heat reflective and microwave radiation impenetrable protection for the camera within the cooking chamber.

Figure 1:
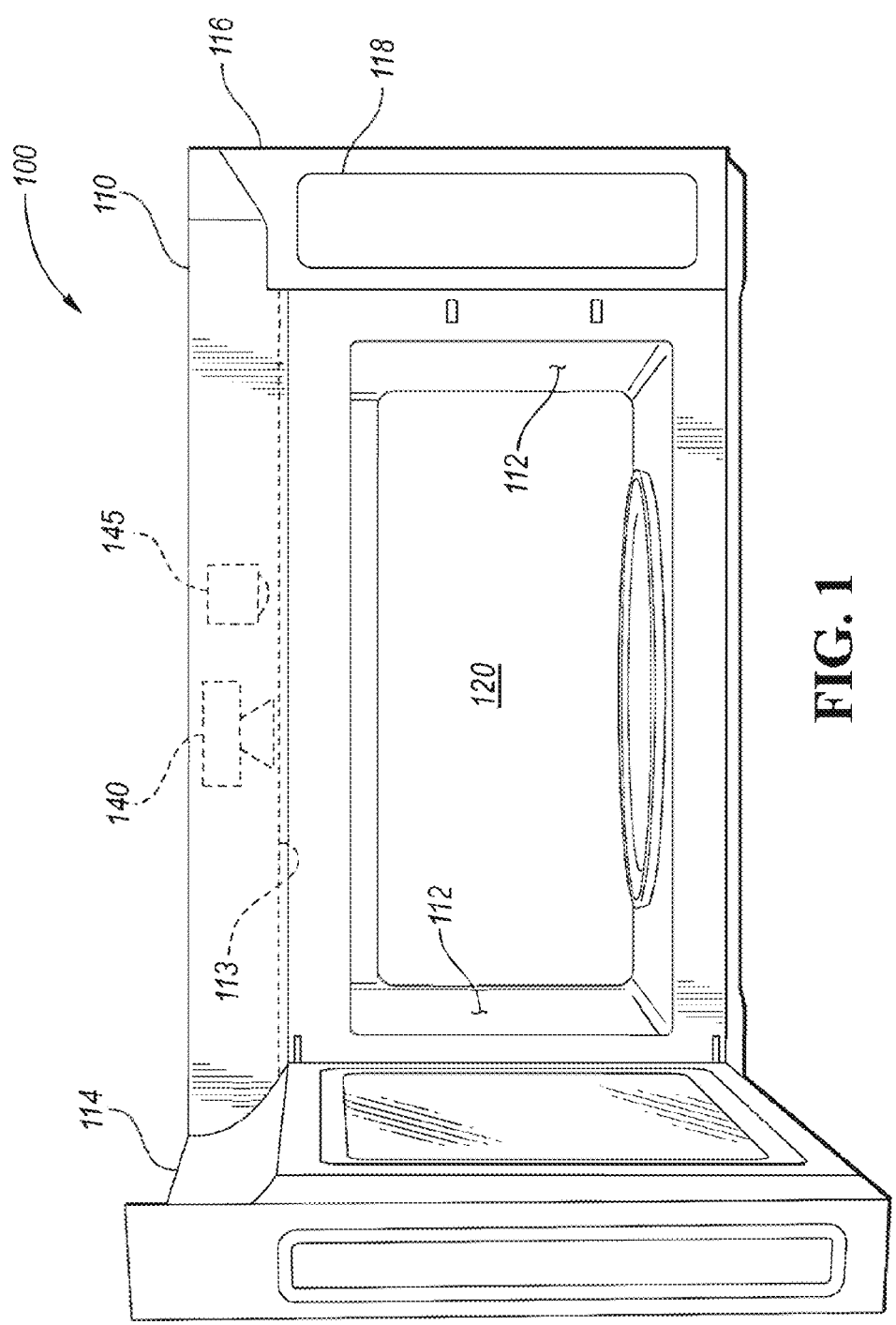
FIG. 1 is a schematic front view of a microwave oven, according to an embodiment.

Referring to FIG. 1, a heating appliance 100 is shown, according to an embodiment. The heating appliance 100 includes a housing 110 with interior walls 112 (including a ceiling 113) defining a cooking chamber 120, and the outer surface 116 exposed to the external environment. The heating appliance 100 includes a door 114 having an open position for providing access to the cooking chamber 120, and a closed position sealing the cooking chamber 120 from the external environment. The cooking chamber 120 is sized based on suitable sizes for kitchen appliances and for receiving food items to be cooked, and may include components for optimizing space and cooking of the food items, such as a turntable (not shown) or shelving racks (not shown). The heating appliance 100 includes a heating mechanism (not shown) for cooking food placed within the cooking chamber 120. The heating mechanism is activated by user input at a control panel 118 located on the outer surface 116 (as shown in FIG. 1) or the door 114 (not shown). The heating mechanism may be included within the housing 110 or within the cooking chamber 120, as dependent on the particular type of heating appliance 100. The heating mechanism may be any suitable mechanism, such as, but not limited to, electric coils, gas, or radiation from magnetrons. Although the heating appliance 100 may be referred to as microwave oven 100, and a microwave oven is depicted in FIG. 1, this is not intended to be limiting and other types of heating appliances such as conventional or conduction ovens are also contemplated as the heating appliance 100, or devices with combination heating functions. As such, the heating appliance 100 may be any suitable domestic appliance for cooking food, such as, but not limited to, ovens, microwave ovens, toaster ovens, and the like, such that the features described herein for the heating appliance 100 are suitable for oven applications where heat and/or microwaves are present within the cooking chamber 120. In the embodiment shown in FIG. 1, the heating appliance 100 is a microwave such that the heating mechanism is a magnetron disposed in the housing 110 in any suitable manner, e.g., between the interior walls 112 and the outer surface 116. The microwave radiation is generated by the magnetron and transmitted via any suitable mechanism, such as a waveguide, a coaxial cable or a strip line which supply the microwave radiation to one or multiple feeding ports (as dependent on the design) which are open to the chamber.

Figure 2:
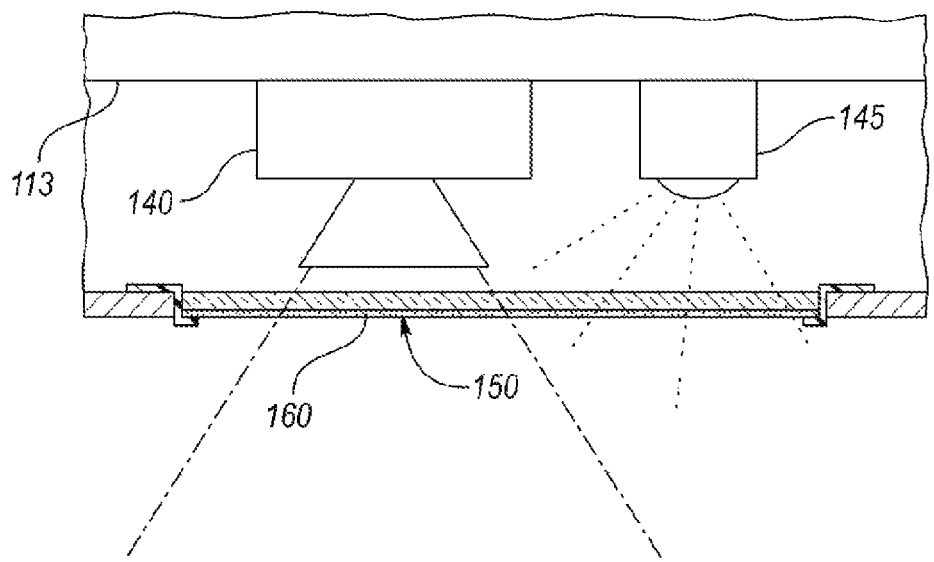
FIG. 2 is a schematic view of the camera, light source, and window shield of FIG. 1.
Figure 3:
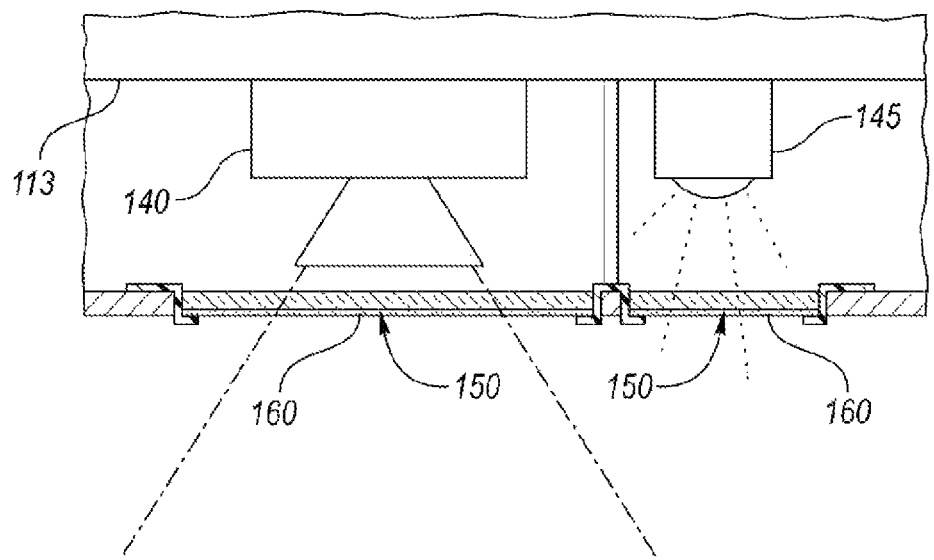
FIG. 3 is a schematic view of a camera, light source, and window shield, according to another embodiment.

As shown in FIG. 1, and in detail in FIGS. 2-3, the heating appliance 100 includes a camera 140 mounted between the outer surfaces 116 and the ceiling 113 such that it can capture images of food within the cooking chamber 120. In the embodiment shown in FIG. 1 and FIGS. 2-3, the camera 140 may be mounted above the ceiling 113, however, in other embodiments, the camera 140 may be mounted to the interior walls 112 or to the ceiling 113 such that it is positioned within the cooking chamber 140. Furthermore, although the camera 140 is shown as mounted above the ceiling 113, the camera 140 may be mounted within the housing 110 behind of the interior walls 112, or within the chamber 120 on any of the internal surfaces (walls 112 or ceiling 113) or at any of the corners of the cooking chamber 120 between adjoining walls 112 and/or the ceiling 113. As such, the camera 140 is shown mounted in the housing 110 within the walls 112 (i.e., between the ceiling 113 and the outer surface 116), this is not intended to be limiting, and the camera 140 may be positioned in any suitable manner capture the food in the chamber 120, and may in some embodiments be positioned fully or partially within the chamber 120 on the interior side of the walls 112 and/or the ceiling 113, or as shown in FIGS. 1-3, set within the housing 110. Thus, the camera 140 may be in any suitable position where the camera lens is exposed to the chamber 120 (e.g., via an opening in the interior walls 112, or within the chamber 120). The angle of the camera 140 is such that the camera 140 can capture and relay images of food items placed within the cooking chamber 120 to a user or a computer for processing (i.e., recognition for cooking time, temperature adjustment, etc.). The camera 140 thus can provide a live-look-in functionality for the heating appliance 100 which allows a consumer to monitor the status of the food, record a video of cooking food, or capture a picture of the food. By including the camera 140, the images or videos may be processed via a processor for image recognition, including, but not limited to food component recognition, rack position, dish classification, etc. Additionally, a consumer can monitor the food cooking status via a user interface on the appliance 100 (for example, on the control panel 118), or via a user device wirelessly connected to the appliance 100 such that the user can recognize when cooking is complete without being present at the heating appliance 100 and without needing to observe through the door 114 or via opening the door 114 by viewing images of the cooking chamber 120 displayed at the user interface or on the user device.

The heating appliance 100 also includes a light source 145 to improve the image and visibility for the camera 140 within the cooking chamber 120, and also for indicating to a user the heating appliance 100 is operating and providing light to improve visibility for the user to the cooking chamber 120 through the door 114. The light source 145 may be any suitable illuminating device such as a LED, an incandescent lamp, a halogen lamp, and the like. The light source 145 may be mounted within the walls 112 (between the outer surface 116 and the walls 112 or the ceiling 113), or to the interior walls 112 or the ceiling 113 as based on the position of the camera 140 (as shown in FIGS. 1-3), or in a separate area from the camera 140 (not shown). The light source 145 may be inset within the walls 112 and exposed to the chamber 120 similar to the mounting variations for the camera 140, and in a shared location (as shown in FIGS. 1-2) or in an independent location. In the embodiment depicted in FIGS. 1-2, both the camera 140 and the light source 145 are mounted within the same area behind the ceiling 113. In FIG. 3, the camera 140 and the light source 145 are mounted within separate areas behind the ceiling 113. The camera 140 and/or the light source 140 may draw power from a power supply (e.g., a wall outlet) connected to the appliance 100. The appliance 100 may be connected to the power supply via any suitable power cable, and may include any components such as, but not limited to, power inverters, transformers, voltage converters, etc., to supply the camera 140 and/or the light source 145 with the required power to operate. The various mounting areas will be described in detail below.

As shown in FIG. 2, the heating appliance 100 includes a shield 150 positioned adjacent to the camera 140. The shield 150 may be mounted using any suitable mechanical mechanism or adhesive, including, but not limited to, silicone glue. In the embodiment shown in FIGS. 1-2, the camera 140 and the light source 145 are positioned adjacent to each other such that they share a common shield 150 for protecting the camera 140 and the light source 145 from radiation/heat from the chamber 120 (i.e., the camera 140 and the light source 145 are mounted in the same area to share the shield 150). However, in other embodiments, as shown in FIG. 3, the light source 145 may include its own shield 150 when positioned separate from the camera 140. As such, the light source 145 may be positioned to share a shield 150 with the camera 140 within the walls 112 or within the chamber 120 (e.g., within the same housing in the chamber 120), or be positioned in its own housing in the walls 112 or in the chamber 120 with a separate shield 150. As such, one or more shields 150 may be included based on the arrangement of the camera 140 and the light source 145 within the housing 110 and/or the chamber 120 and the depiction of adjacent positions of the camera 140 and the light source is not intended to be limiting.

In the embodiment shown in FIGS. 1-3, the camera 140 and the light source 145 are inset into the ceiling 113, such that the shield 150 aligns with the ceiling 113. In this embodiment, the shield 150 may be mounted using any suitable mechanism, including but not limited to an adhesive such as silicone glue. In other embodiments (not shown), the shield 150 may be mounted in any suitable manner to protect the camera 140 and/or the light source 145 from heat and/or radiation from the chamber 120, and may be inset as well or protrude into the chamber 120. The design selection for the position of the shield 150 may be dependent upon the mounting selection for the light source 145 and the camera 140, and the mounting selection of each of the camera 140 and the light source 145 may be independent of the position of the other, or depend on each other (e.g., optimal lighting). As such, the shield 150 may be aligned with the walls 112 or the ceiling 113 (as shown in FIGS. 1-3), or the shield 150 may be in the chamber 120, where the camera 140 and/or the light source 145 are mounted within the chamber 120. It is further contemplated where the shield 150 is included within the chamber (i.e., not flush with the interior walls 112 or the ceiling 113), that the shield 150 may be comprised of any number of shield components to form a housing as shield 150.

Furthermore, the shield 150 may be any suitable geometry as based on the camera 140 and light source 145 design. In the embodiments shown in the Figures, the shield 150 is a flat panel, however in other embodiments, the shield may have a concave or convex shape depending on the camera lens specification and the region of interest being captured within the chamber 120, and/or based on aesthetic considerations for the heating appliance 100. Additionally, the shield 150 may have a rectangular, round, semi-circular, or other suitable shape as based on the heating appliance 100 design and the aesthetics of the chamber 120, and/or as required for capturing the region of interest of the chamber 120. The shield 150 may be made of any suitable material capable of withstanding (i.e., maintaining its structural integrity without deforming) the heat (i.e., thermal radiation) and/or microwave radiation within the cooking chamber 120, such as, but not limited to, glass or plastic (e.g., acrylic), to shield the lens of the camera 140 and the light source 145 from food splatter from heating food items within the cooking chamber while having sufficient durability to withstand the environment (for example, high temperature resistant (e.g., for a microwave with magnetrons as the only heating mechanism (no grill or forced convection) greater than 110° C.)) and sufficient transparency to not reduce or obstruct the view and image quality of the camera 140. The transparency of the shield 150 allows sufficient light to pass through so that food within the cooking chamber 120 can be seen and captured by the camera 140. The shield 150 may have a transparency of at least 50% in some embodiments, 55 to 100% in other embodiments, and 60 to 100% in yet other embodiments. The shield 150 may have any suitable thickness, such as, in some embodiments 0.5 to 5 mm, in other embodiments 0.75 to 4.5 mm, and in yet other embodiments, 1.0 to 4.0 mm.

As previously discussed, depending on the type of the heating mechanism, the camera 120 may be exposed to thermal radiation (i.e., heat) and/or microwave radiation through the shield 150, which can impact performance (i.e., image quality provided), structural integrity, and durability of the camera 140, and the structural integrity, durability, and transmission of the light from the light source 145. As such, the heating appliance 100 includes at least one transparent conductive metal coating 160 on the shield 150 to protect the camera 140 and the light source 145 from heat and/or microwave radiation. The transparent conductive metal coating 160 may be disposed on the shield 150 on the side exposed to the cooking chamber 120, the side exposed to the camera 140 and/or light source 145, or both. In the embodiments shown in FIGS. 1-3, the transparent conductive metal coating 160 is shown on the side of the shield 150 exposed to the chamber 120. The shield 150 may predominantly dissipate the thermal radiation from the chamber 120, while the transparent conductive metal coating 160 reflects the microwave radiation, however each component may contribute to the microwave reflection and the heat dissipation, and vice versa, and any discussion of the properties of the shield 150 and the coating 160 may be collectively considered for the combination of the shield 150 and the coating 160. Although one conductive metal coating 160 on a single side of the shield 150 is shown in FIGS. 1-3, the shield 150 may be coated with one or more conductive metal coatings 160, or a combination of conductive metal coatings 160, on either or both sides of the shield 150 to protect the camera 140 and/or the light source 145 from heat and/or microwave radiation.

As such, the transparent conductive metal coating 160 reflects microwave radiation and aids in the heat dissipation of the shield 150 such that the camera 140 and/or the light source 145 is not exposed to the heat and/or microwave radiation from the cooking chamber 120. The transparent conductive metal coating 160 may have any suitable reflectivity to microwaves and any suitable thermal conductivity based on the generation/rating of the heating appliance 100, and can be tailored using various conductive metals or thicknesses of the coating 160. In certain embodiments, for example, the transparent conductive metal coating has a reflectivity to microwaves with attenuation over 45 dB or a leakage of less than 0.6 mw/cm$^2$ at 2.45 GHz, and no absorptivity to microwaves. In one or more embodiments, the transparent conductive metal coating 160 may include any suitable transparent conductive metal, such as, but not limited to, silver, tin oxide, gold, copper, zinc oxide, or combinations thereof. Furthermore, the transparent conductive metal may be a fluorine-doped or indium-doped conductive metal.

In certain embodiments, the transparent conductive metal coating 160 may include fluorine doped tin oxide, indium doped tin oxide, fluorine doped zinc oxide, indium doped zinc, or combinations thereof. Furthermore, the thickness of the transparent conductive metal coating 160 may be designed based on the heat resistant properties of the selected material, and any discussion of thicknesses is not intended to be limiting. For example, for certain materials, the thickness may range from 0.0025 to 0.5 mm in certain embodiments, 0.005 to 0.4 mm in other embodiments, and 0.01 to 0.25 mm in yet other embodiments. Furthermore, the transparent conductive metal coating 160 may be thin enough not to affect the visibility of the camera 140 and light transmission through the shield 150 and the transparent conductive metal coating 160. In certain embodiments, the transparent conductive metal coating 160 may have a substantially uniform thickness across the shield 150. In embodiments with a coating 160 on both sides of the shield 160, the coating 160 may be the same material or a different material, or may be the same thickness or a different thickness. As such, the transparent conductive metal coating 160 forms a thermally conductive coating and reflects penetration of microwave radiation therethrough.

The transparent conductive metal coating 160 has a reflectivity to microwave, in some embodiments, above 45 dB at 2.45 GHz. The reflectivity of the conductive coating is the measure of energy reflected by the transparent conductive metal coating 160 at a given wavelength (e.g., 2.45 GHz for commercial microwave ovens). As such, the transparent conductive metal coating 160 may be, in some embodiments 95 to 100% reflective to microwave radiation, in other embodiments 96 to 100% reflective, and in yet other embodiments 97 to 100% reflective. With regard to microwave radiation penetration, the transparent conductive metal coating 160 in some embodiments has an absorptivity to microwaves of 0 to 5%, in other embodiments, 0 to 2.5%, and in yet other embodiments, 0 to 1%. The absorptivity of the transparent conductive metal coating 160 is the measure of a materials' effectiveness in absorbing radiant energy.

The transparent conductive metal coating 160 is transparent to allow for sufficient transparency (i.e., light transmission) through the coating 160 and the shield 150, as to not reduce or obstruct the view and image quality of the camera 140 and light transmission from the light source 145 through the shield 150 and the transparent conductive metal coating 160, while keeping the camera 140 and the light source 145 protected from heat and microwave radiation (e.g., below a threshold temperature, for example, under 70° C. for certain cameras). Although the transparency is discussed above with respect to the shield 150, the transparent conductive metal coating 160 may have similar transparencies as to not affect the transparency through the shield 150. The transparent conductive metal coating 160 may have a transparency of at least 50% in some embodiments, 55 to 100% in other embodiments, and 60 to 100% in yet other embodiments. Additionally, the transparency of the combination of the shield 150 with the coating 160 on one or both sides may be, in some embodiments, at least 35%, in other embodiments 40 to 100%, and in yet other embodiments 50 to 100%. In one or more embodiments, the transparency of the shield 150 with the coating 160 on one or both sides may be at least 70%. The percent transparency is related to the fraction transmittance measure (Tr) as measured by ASTM 1746.

For example, an opacity of 0.0 to 0.65 indicates the sample is 35 to 100% transparent (which is indicative of 100% transparent minus the sum of absorption and reflection). As such, the coated shield 150 can protect the camera 140 and/or the light source 145 and still provide visibility and light transmission for viewing and capturing images of the food in the chamber 120.

According to one or more embodiments, a heating appliance includes a camera within a cooking chamber for capturing images of food being heated in the cooking chamber. The camera allows users to monitor the cooking of the food, or for a computer to process the images of the food for recognition and setting selections (e.g., temperature or time). The heating appliance utilizes a heating mechanism (in the cooking chamber or within a housing such that thermal or microwave radiation is provided to the cooking chamber) to cook the food in the cooking chamber. To protect the camera from heat and/or microwave radiation, the heating appliance includes a window shield within the cooking chamber. The window shield includes a pane coated with a conductive coating on the side exposed to the food to reflect and absorb heat and/or microwave radiation. The window shield is sufficiently transparent to allow light transmission to allow the camera to view the food and not impair the image quality.

Except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic (e.g., with respect to transparency as measured by opacity). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heating appliance, comprising:
   a housing having interior walls with interior surfaces defining a cooking chamber for heating food;
   a camera positioned within the housing to capture images of food in the chamber; and
   a shield positioned between the camera and the food, and aligned flush with the interior walls, the shield having a body with a first surface facing an area within the chamber for receiving food and a second opposite surface facing the camera, the shield including a first transparent thermally conductive and microwave reflective metal coating both of the first surface and the second surface, such that the shield dissipates heat and reflects microwave radiation to protect the camera.

2. The heating appliance of claim 1, wherein the first transparent conductive metal coating is at least one of silver, gold, copper, tin oxide, or zinc oxide.

3. The heating appliance of claim 1, wherein the first transparent conductive metal coating is fluorine doped or indium doped.

4. The heating appliance of claim 1, wherein the first transparent conductive coating is a fluorine doped tin oxide, an indium doped tin oxide, a fluorine doped zinc oxide, or an indium doped zinc oxide.

5. The heating appliance of claim 1, wherein the shield with the first transparent conductive coating has an opacity of 0.0 to 0.65.

6. The heating appliance of claim 1, wherein the shield with the first transparent conductive coating has a transparency of at least 70%.

7. The heating appliance of claim 1, wherein the shield is glass or plastic.

8. The heating appliance of claim 1, further comprising a light source mounted to the housing and positioned to illuminate the chamber.

9. The heating appliance of claim 8, wherein the light source is positioned adjacent to the camera and facing the second surface such that both the camera and the light source are protected by the shield.

10. The heating appliance of claim 8, further comprising a light source housing having an inner surface facing the light source and an outer surface facing the area within the chamber for receiving food, the light source housing including a second transparent conductive metal coating on the outer surface to protect the light source from heat, microwave radiation, or both.

11. The heating appliance of claim 1, wherein the camera is mounted to the interior surfaces of the interior walls within the chamber.

12. The heating appliance of claim 1, wherein the camera is mounted to the housing on an opposite side of the interior walls with respect to the interior surfaces such that the camera captures images of the chamber via an opening in the interior walls.

13. A heating appliance comprising:
    a housing having interior walls with interior surfaces defining a cooking chamber for heating food, the housing defining an inner cavity between outer walls and the interior walls;
    a shield mounted to the housing and having a body with an outer surface facing a food area and an inner surface facing the inner cavity and aligned flush with the interior walls, the body including a transparent thermally conductive and microwave reflective metal coating on both the outer surface and the inner surface;
    a camera mounted within the inner cavity of the housing, and positioned to capture images of the food area through the shield; and
    a light source mounted within the inner cavity to transmit light through the shield,
    wherein the shield is sized to protect the camera and the light source such that the shield reflects microwave radiation and dissipates heat to protect the camera and the light source.

14. The heating appliance of claim 13, wherein the transparent conductive metal coating is silver, gold, copper, tin oxide, or zinc oxide.

15. The heating appliance of claim 13, wherein the transparent conductive metal coating is fluorine doped or indium doped.

16. The heating appliance of claim 13, wherein the shield with the transparent conductive coating has an opacity of 0.0 to 0.65.

17. A heating appliance comprising:
    a housing having interior walls with interior surfaces defining a cooking chamber for heating food, the housing defining inner regions between outer walls and interior walls;
    a plurality of shields mounted to the housing and aligned flush with the interior walls, each shield having a body with an outer surface facing the food and an inner surface facing a corresponding inner region of the housing, the body including a transparent conductive metal coating on both the outer surface and the inner surface;
    a camera mounted within a first inner region of a first shield of the plurality of shields, and positioned to capture images of the food through the first shield; and
    a light source mounted within a second inner region of a second shield of the plurality of shields to transmit light through the second shield, wherein each of the first and second shields protects the camera and the light source, respectively, by dissipating heat and reflecting microwave radiation.

18. The heating appliance of claim 17, wherein the transparent conductive metal coating is silver, gold, copper, tin oxide, or zinc oxide.

19. The heating appliance of claim 17, wherein the transparent conductive metal coating is fluorine doped or indium doped.

20. The heating appliance of claim 17, wherein each shield with the transparent conductive coating has an opacity of 0.0 to 0.65.

* * * * *